(No Model.) 3 Sheets—Sheet 1.

W. CHATER.
POTATO HARVESTER.

No. 590,184. Patented Sept. 14, 1897.

Witnesses
Inventor
Wm. Chater.
By his Attorney (No Model.) 3 Sheets—Sheet 2.

W. CHATER.
POTATO HARVESTER.

No. 590,184. Patented Sept. 14, 1897.

Witnesses
Inventor
Wm. Chater.
By his Attorney

THE NORRIS PETERS CO., PHOTO-LITHO., WASHINGTON, D. C.

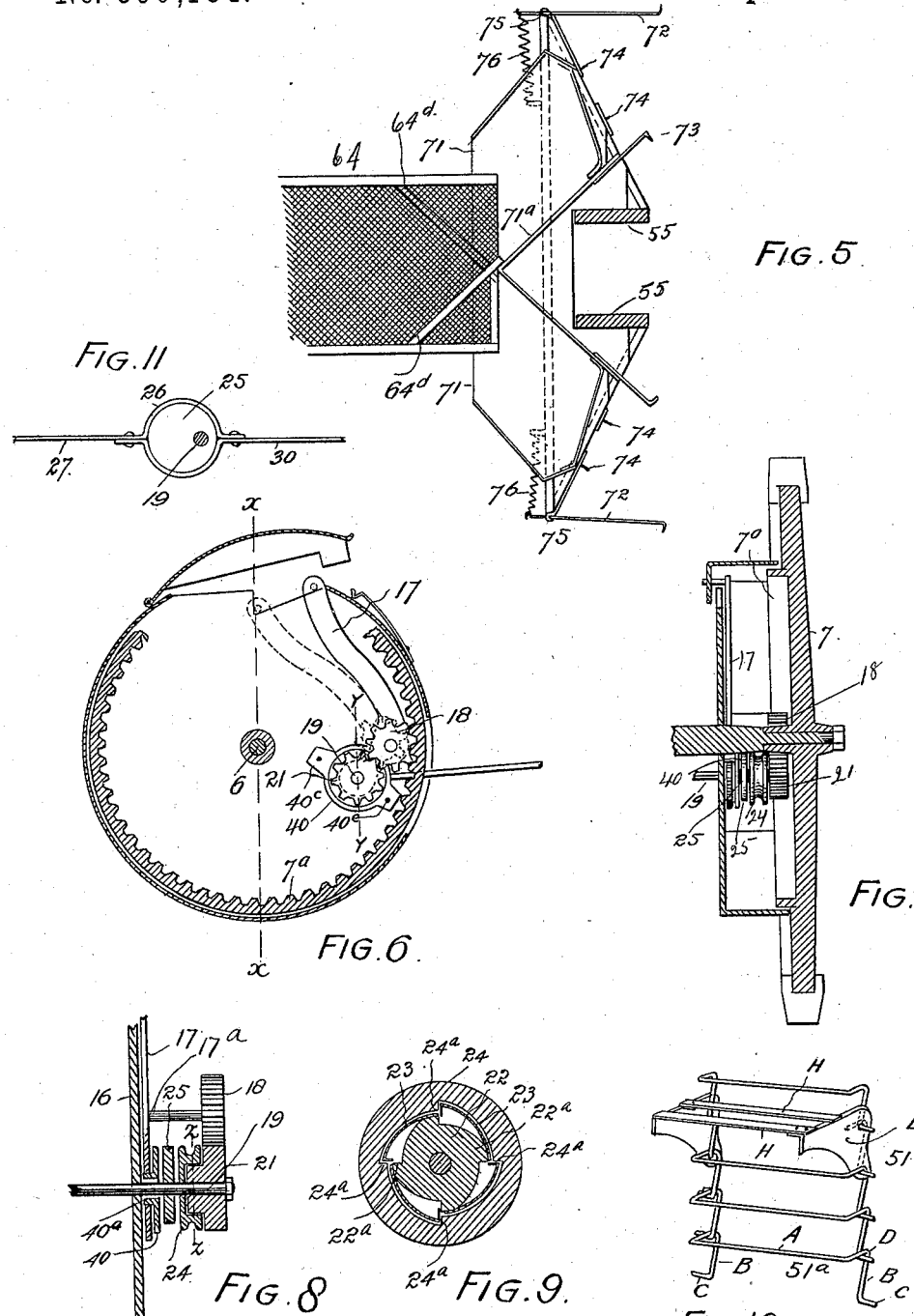

UNITED STATES PATENT OFFICE.

WILLIAM CHATER, OF DENVER, COLORADO, ASSIGNOR OF ONE-HALF TO DAVID REDIGER.

POTATO-HARVESTER.

SPECIFICATION forming part of Letters Patent No. 590,184, dated September 14, 1897.

Application filed January 18, 1897. Serial No. 619,590. (No model.)

*To all whom it may concern:*

Be it known that I, WILLIAM CHATER, a citizen of the United States of America, residing at Denver, in the county of Arapahoe and State of Colorado, have invented certain new and useful Improvements in Potato-Harvesters; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to improvements in potato-harvesters; and it consists of the features, arrangements, and combinations hereinafter described and claimed, all of which will be fully understood by reference to the accompanying drawings, in which is illustrated an embodiment thereof.

Figure 1:
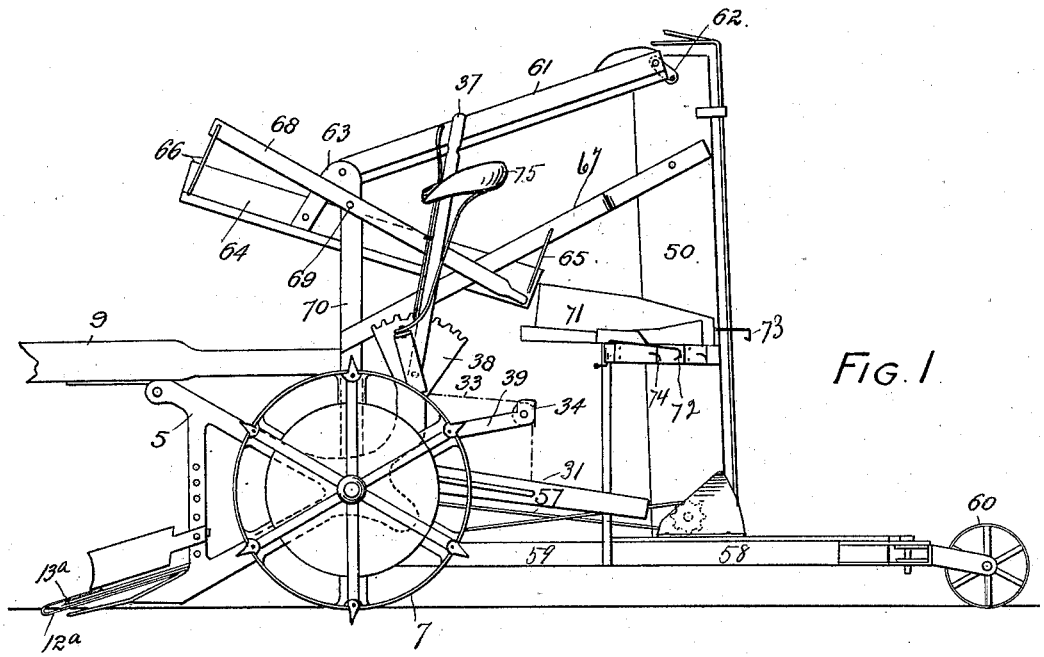
Figure 2:
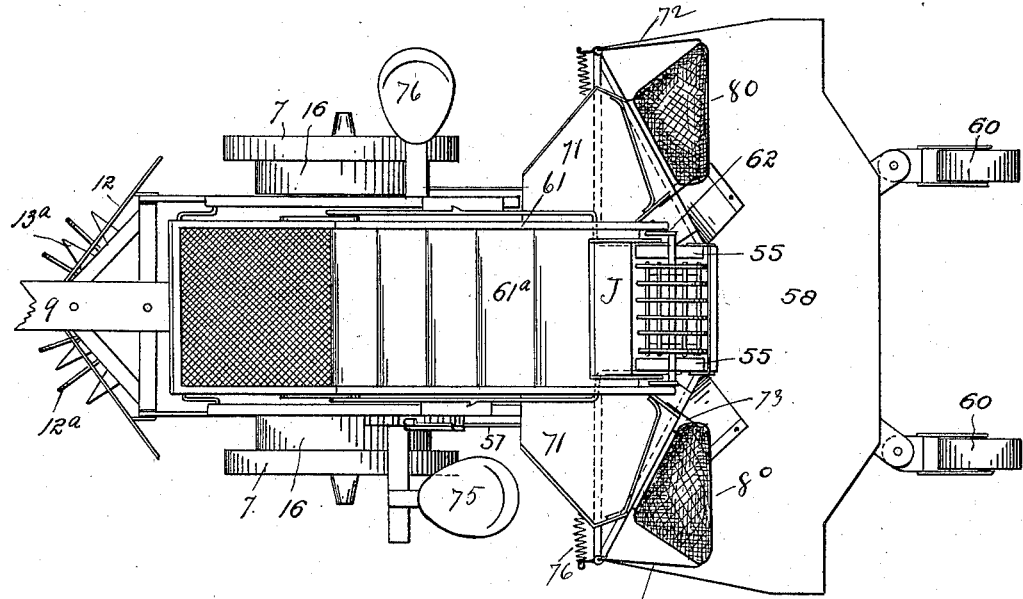
Figure 3:
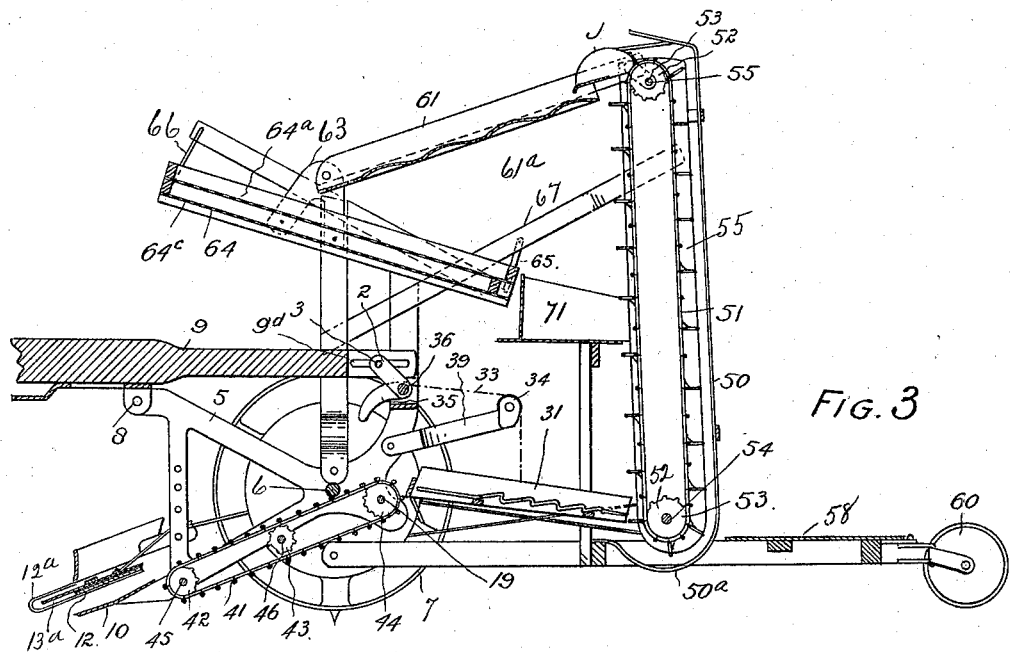
Figure 4:
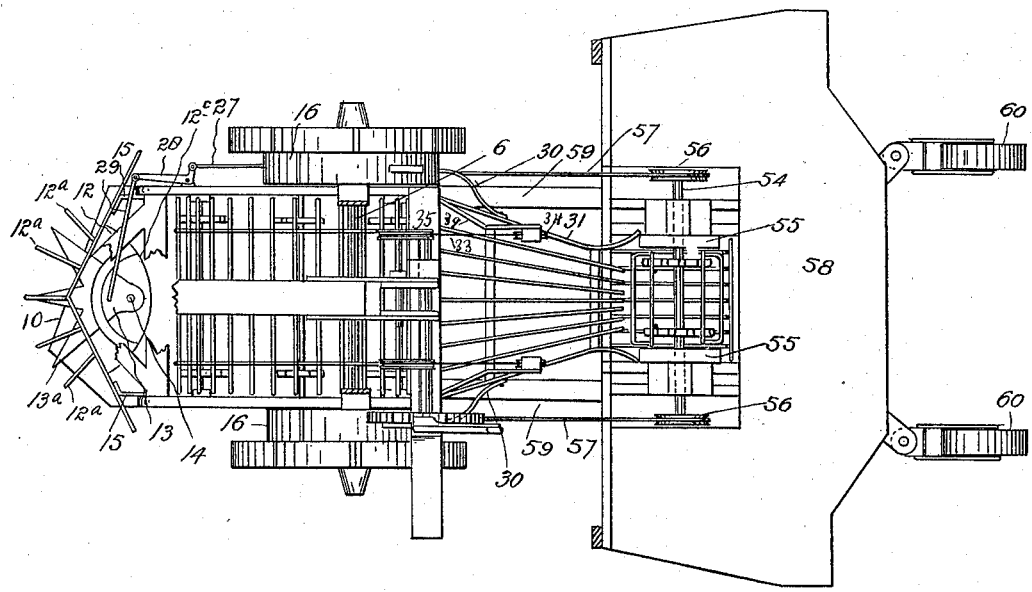

In the drawings, Figure 1 is a side elevation of the machine. Fig. 2 is a top or plan view of the same. Fig. 3 is a vertical longitudinal section taken through the center thereof. Fig. 4 is a plan view, partly in horizontal section, the upper portion of the mechanism being removed. Fig. 5 illustrates the sacking mechanism, the parts being shown in detail and on a larger scale. Fig. 6 is a section taken through the gear of the driving-wheel. Fig. 7 is section taken on the line $xx$, Fig. 6. Fig. 8 is a section taken on the line $y\,y$, Fig. 6. Fig. 9 is a section taken on the line $z\,z$, Fig. 8. Fig. 10 illustrates the construction of the elevator, the parts being shown on a larger scale.

Similar reference-characters indicating corresponding parts in these views, let the numeral 5 designate the framework, in which is journaled a shaft or axle 6, to which the driving-wheels 7 are made fast. The upper front portion of the frame 5 is attached to a hanger 8, secured to the rear portion of the tongue 9. To the lower forward part of the frame 5 is attached the plow or digger shovel 10. Above the plow and also attached to the frame 5 is located the vine cutting and clearing apparatus, which will now be described.

The V-shaped guard 12 has its apex pointed forward and is provided with the double fingers $12^a$, forming loops within which operate the teeth $13^a$ of the cutter 13, which is pivoted, as shown at 14, to the plate $12^c$, the latter being attached to the guard-plates 12, which are secured to the frame 5 by the angle-plates 15.

To the frame 5, on each side of the machine, is attached a drum-shaped casing 16, which incloses a cogged flange $7^a$, formed on the drive-wheel 7. Within each casing 16 is located a curved lever 17, having a pin $17^a$, carrying a fast pinion or small gear 18, the lower extremity of the lever being fulcrumed on a collar surrounding a shaft 19, said collar being secured to the casing, as hereinafter described.

The pinion 18 normally meshes with the cogged flange $7^a$, and also with a gear 21, made fast to the shaft 19. On the gear 21 is formed a cam 22, having projections $22^a$, to which are attached springs 23. This cam 22 projects into a recess formed in the pulley 24, provided with offsets $24^a$, so arranged that the turning of the gear 21 in one direction actuates the pulley, since the springs 23 engage the offsets, thus locking the pulley and cam together, while the gear and its cam can turn in the opposite direction without actuating the pulley, since the springs in that case readily slip over the offsets. (See Fig. 9.) The shaft 19 also carries an eccentric disk 25, to whose strap 26 is attached a pitman 27, leading to one arm of a bell-crank lever 28, fulcrumed on the frame 5 of the machine. To the other arm of this lever 28 is attached a connecting-rod 29, which leads to and operates the cutter 13. The parts 27, 28, and 29 are located only on one side of the machine, while the other mechanism inclosed within the casing 16 and connected therewith is double, being the same on both sides of the machine. Hence only a single set of devices need be described.

To the opposite side of the eccentric-strap 26 is attached a pitman 30, which leads to a screen 31, whose inclination is controlled by chains 33, passing over pulleys 34 and engaging the grooved arms 35, to which they are made fast. These arms 35 are made fast to a shaft 36, to which is secured the lower extremity of a lever 37, engaging a toothed segment 38. The shaft 36 is suitably journaled in the framework of the machine. To this shaft 36 is also attached a crank 2, carrying a pin or projection 3, engaging a slot 9ᵈ, formed in the rear extremity of the tongue. As the shaft 36 is turned the framework is raised or lowered, thus elevating or depressing the plow 10. The pulleys 34 are mounted on arms 39, rigidly secured to the framework 5.

The fulcrumed extremity of the lever 17 surrounds a collar $40^a$, formed on a device 40, secured to the drum-casing 16 by means of projections $40^c$, through which are passed suitable fastening devices, as rivets or screws. The collar $40^a$ is sufficiently large so as not to touch the shaft 19. Hence this construction prevents any friction between the lever and said shaft. The function of the lever 17 is the adjustment of the pinion 18, whereby the said pinion is thrown into or out of mesh with the cogged flange 7 of the drive-wheel, according as it is or is not necessary to actuate the shaft 19 and its connections.

The potatoes are carried from the plow to the screen 31 by a carrier 41, mounted on sprockets 42, 43, and 44. The sprocket 44 is fast on the shaft 19, whereby the elevator is propelled when the machine is "in gear," so to speak. The sprocket 43 is an idler or agitating sprocket and only engages the upper part of the carrier. The sprocket 42 is fast on a shaft 45, suitably journaled in the framework of the machine. As the potatoes leave the screen 31 they fall into the bottom of a sort of hood or elevator-casing 50, composed of rods $50^a$, partly inclosing the upright elevator 51, engaging sprocket-wheels 52, fast on shafts 53 and 54, said shafts being journaled in the upright side boards 55. On the shaft 54 is made fast two pulleys 56, which engage crossed belts 57, surrounding the pulleys 24 on the shaft 19. The boards 55 are mounted on the platform 58, which is connected with the main frame by bars 59. The rear portion of this platform is also supported on small wheels or casters 60.

The elevator 51 is composed of members $51^a$, each formed from an integral rod or wire and comprising the horizontal part A, the vertical parts B, and the outwardly-projecting hooks C. The part A, except when at and passing around the ends of the elevator-frame, occupies a horizontal position, being U-shaped. The part A merges into the part B by a downward bend D. The part C is merely an outwardly-projecting hook formed at the lower extremity of each part B. The parts $51^a$ are connected by the engagement of the hooks C of one member with the bends D of the other member. This skeleton elevator is provided with brackets E, located at suitable intervals and mounted on the hooks C of any two members, said brackets being connected by slats H.

The potatoes are discharged from the elevator 51 into a small chute J, which is hinged to the upright boards of the elevator and rests upon the upper extremity of the movable chute 61, the latter having an undulating bottom $61^a$. The upper extremity of this chute is supported on cranks 62, made fast to the extremities of the elevator-shaft 53. The lower extremity of the chute 61 is attached to brackets 63, secured to the sides of a screen-frame 64, the latter being supported by means of hangers 65 and 66. The hangers 65 are connected with the stationary bar 67, forming a part of the stationary framework, while the hangers 66 are connected with the forward extremities of two levers 68, fulcrumed at 69 on the upright bars 70 of the framework. The frame 64 carries two screens $64^a$ and $64^c$, one being located above the other. The screen $64^a$ is uppermost and the coarser of the two screens, its mesh being so regulated as to allow the small potatoes to drop through to the screen $64^c$.

From the device 64 the potatoes pass to a double chute 71, having a V-shaped partition $71^a$. The large potatoes or those leaving the screen $64^a$ pass to one side of the chute by virtue of a guide $64^d$, attached to the end of the screen and so located as to produce this result. The small potatoes as they leave the screen $64^c$ pass to the opposite side of the chute for the same reason. Each part of the double chute is provided with sack-holding devices, composed of hooks 72, 73, and 74. The hook 72 is lever-like, being pivoted on the chute, as shown at 75, its opposite extremity being connected with a spring 76. This spring causes the hook to hold the sack in the wide-open position. It will be readily seen that the large potatoes pass into one sack, while the small potatoes pass into the other sack.

The operation of the mechanism will now be described, assuming that the machine is in gear—that is to say, that the gear 18 is meshing with the gear $7^a$ of the driving-wheel. As the machine is drawn forward the movement of the driving-wheel 7 imparts motion to the gear 18. The latter, meshing with the gear 21, rotates the shaft 19. The movement of this shaft imparts a rotary movement to the eccentric disk 25, which operates the vine-cutter 13 through the medium of the pitman 27, the bell-crank lever 28, and the connecting-rod 29. The movement of the eccentric also imparts a shaking movement to the screen 31 through the medium of the pitman 30. The pulley 24, which rotates with the shaft 19 when the machine is making the forward movement, imparts motion to the upright elevator 51 through the medium of a belt 27 and a pulley 57. The movement of the elevator imparts motion to the shaft 33, whose rotation gives a shaking movement to the chute 61 by virtue of the cranks 62, to which the upper extremity of the chute 61 is pivoted. The movement of the chute 61 also imparts a shaking movement to the screen-frame 64 by virtue of the connection of the screens by the brackets 63. As the plow or digger 10 enters the ground the potatoes are dug and moved forward to the elevator 41, which carries them to the screen 31, from which they pass to the elevator 51, thence to the screen 61, thence to the screen 64ᵃ, through which the small potatoes pass to the screen 64ᶜ. From these screens the potatoes pass to the sack-holding apparatus and thence to the sacks 80. (See Fig. 2.) After leaving the plow or digger the potatoes are completely separated from the dirt while passing through the machine.

The cam-wheel 22, with its springs 23, imparts movement to the pulleys 24, and thence to the operating parts of the machine when the latter is moved forward, as heretofore stated, but when the machine is moved backward, which is sometimes necessary, the cam-wheel 22, with its shaft 19, is free to rotate without turning the pulley 23, since the springs will give sufficiently for this purpose. (See Fig. 9.)

The man who drives the team sits upon the seat 75. Another seat 76 is also shown upon the machine. This is to be occupied by another man, who assists the driver in the management of the apparatus.

Having thus described my invention, what I claim is—

1. In a potato-harvester, the combination with a suitable frame, the main shaft or axle, the driving-wheels and a plow or digger, of a toothed vine-cutter pivoted on a suitable support, a stationary guard having double fingers in which the cutter operates, and means for operating the cutter comprising a shaft 19 journaled in the frame, a gear connection between said shaft and one of the driving-wheels, an eccentric mounted on the shaft, a bell-crank lever fulcrumed on the frame, a pitman connecting the eccentric with one arm of the lever, and a connecting-rod leading from the other arm of the lever to the vine-cutter, an inclined screen located to the rear of the elevator, an upright elevator located to the rear of the screen, and means for operating said last-named elevator, comprising a gear 21 fast on the shaft 19 and carrying a series of cams provided with springs, a pulley 24 surrounding the cam portion of the gear and having offsets to engage the springs, a gear meshing with the gear 21 and also with an internal gear on one of the driving-wheels, and a suitable belt connecting the pulley 24 with the pulley of the upright elevator.

2. In a potato-harvester, the combination with a suitable frame, the main shaft or axle, driving-wheels, a plow or digger, an elevator to the rear of the plow, an inclined screen located to the rear of the elevator, an upright elevator located to the rear of the screen, and means for operating said last-named elevator comprising a shaft journaled in the frame, a gear 21 fast thereon and carrying a series of cams provided with springs, a pulley 24 surrounding the cam portion of the gear and having offsets to engage the springs, a gear meshing with the gear 21 and also with an internal gear on one of the driving-wheels, and a suitable belt connecting the pulley 24 with the pulley of the upright elevator.

3. In a potato-harvester, the combination of a suitable frame, a shaft or axle, driving-wheels, a plow or digger, an elevator located to the rear of the digger, a screen located to the rear of the elevator, an upright elevator located to the rear of the screen, short cranks attached to the upper shaft of the last-named elevator, an inclined chute whose upper extremity is attached to said cranks, an inclined movable frame suitably connected with the lower extremity of said chute, two screens of different mesh located in said frame and adapted to separate the larger from the smaller potatoes, and suitable sacking mechanism located at the lower extremities of the screens, substantially as described.

4. An elevator comprised of members 51ᵃ formed from an integral rod or wire and comprising the horizontal part A, the vertical parts B the downward bends D and the outwardly-projecting parts C, and brackets E suitably connected to form buckets, said buckets being located at suitable intervals and mounted on the hooks C of any two members.

In testimony whereof I affix my signature in presence of two witnesses.

WILLIAM CHATER.

Witnesses:
ALFRED J. O'BRIEN,
G. J. ROLLANDET.